United States Patent
Muto

(10) Patent No.: US 6,923,603 B2
(45) Date of Patent: Aug. 2, 2005

(54) MACHINE TOOL WITH A FEATURE FOR PREVENTING A THERMAL DEFORMATION

(75) Inventor: Ai Muto, Kanagawa (JP)

(73) Assignee: Makino Milling Machine Co., LTD, Tokyo (JP)

( * ) Notice: Subject to any disclaimer, the term of this patent is extended or adjusted under 35 U.S.C. 154(b) by 0 days.

(21) Appl. No.: 10/257,467

(22) PCT Filed: Feb. 12, 2002

(86) PCT No.: PCT/JP02/01155

§ 371 (c)(1),
(2), (4) Date: Oct. 11, 2002

(87) PCT Pub. No.: WO02/064307

PCT Pub. Date: Aug. 22, 2002

(65) Prior Publication Data

US 2003/0103825 A1 Jun. 5, 2003

(30) Foreign Application Priority Data

Feb. 13, 2001 (JP) .......................... 2001-036135

(51) Int. Cl.⁷ .............................. B23C 9/00; B23Q 11/12
(52) U.S. Cl. ........................ 409/135; 409/136; 409/219; 409/225
(58) Field of Search .................................... 409/135, 136, 409/219, 225

(56) References Cited

U.S. PATENT DOCUMENTS

| 3,555,962 | A | * | 1/1971 | Wolf et al. | .................. | 409/135 |
| 4,614,469 | A | * | 9/1986 | Beere et al. | ................. | 409/219 |
| 4,952,105 | A | | 8/1990 | Kitamura | | |
| 5,290,130 | A | * | 3/1994 | Beretta | ........................ | 409/135 |
| 5,738,572 | A | * | 4/1998 | Giebmanns | .................. | 451/221 |
| 6,599,066 | B1 | * | 7/2003 | Koike et al. | ................. | 409/135 |

FOREIGN PATENT DOCUMENTS

| DE | 19514390 A1 | * | 10/1996 | ............ B23Q/1/01 |
| DE | 10049810 A1 | * | 4/2002 | ............ B23Q/1/01 |
| EP | 524747 A1 | * | 1/1993 | ............ B23Q/11/10 |
| JP | 61026453 A | * | 2/1986 | .......... H02K/15/12 |
| JP | 07144155 | | 6/1995 | |
| JP | 08335464 | | 12/1996 | |
| JP | 10315097 | | 2/1998 | |
| JP | 10156661 A | * | 6/1998 | ........... B23Q/11/10 |
| JP | 10 193238 | | 7/1998 | |
| JP | 10249660 A | * | 9/1998 | ............ B23Q/1/01 |
| JP | 11129087 | | 5/1999 | |
| JP | 2000042864 | | 2/2000 | |

* cited by examiner

Primary Examiner—Derris H. Banks
Assistant Examiner—Dana Ross
(74) Attorney, Agent, or Firm—Paul & Paul

(57) ABSTRACT

A machine tool 1 comprises a spindle head 11 for supporting a spindle 9 to which a tool 7 is fitted, a column 5 for supporting the spindle head 11 and a table 13 for mounting a workpiece 15, and machines the workpiece 15 by relatively moving the tool and the workpiece. A cavity 5a is defined in the column so that a liquid can be circulated. A liquid pump 19 is provided for circulating the liquid into the cavity 5a. A circulating pump controller 27 is provided for controlling the circulation of the liquid by activating and deactivating the liquid pump 19. By circulating the liquid into the cavity 5a of the column 5, the temperature of each part of the column 5 is evenly maintained to prevent the thermal deformation of the column 5.

14 Claims, 2 Drawing Sheets

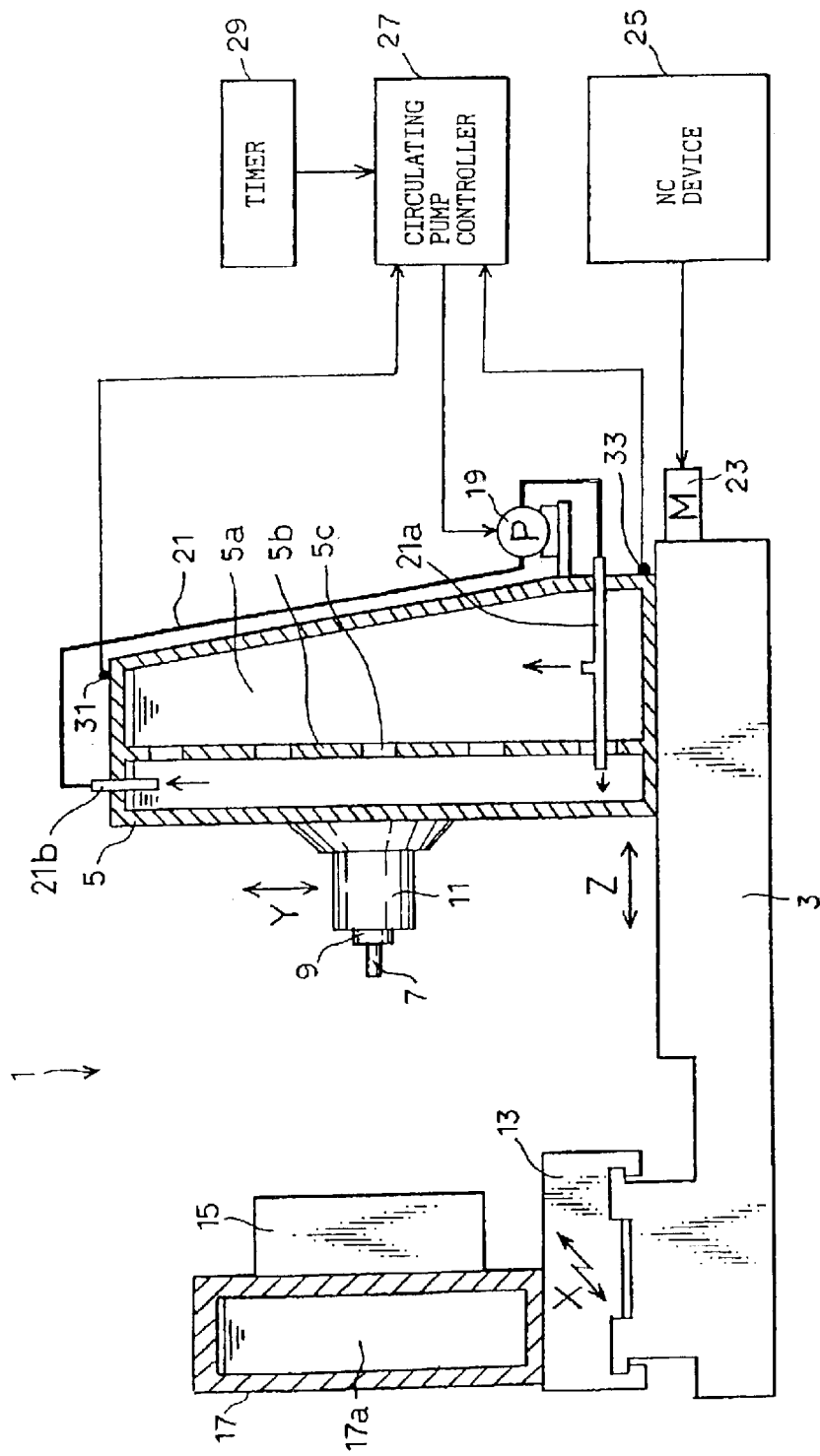

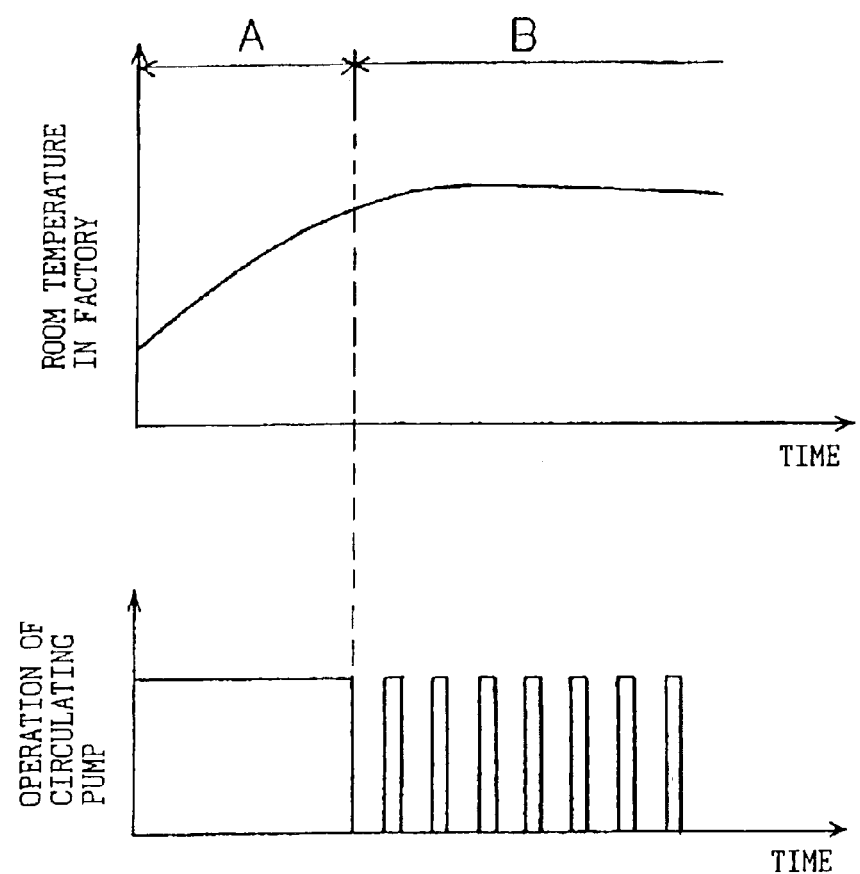

MACHINE TOOL WITH A FEATURE FOR PREVENTING A THERMAL DEFORMATION

TECHNICAL FIELD

The present invention relates to a machine tool which machines a workpiece by relatively moving a tool and the workpiece, and in particular to a machine tool which is improved to prevent a thermal deformation by evenly maintaining the temperature of each part of machine tool such as a column and a workpiece mount for mounting the workpiece.

BACKGROUND ART

Generally, an air conditioner is provided in a factory within which a machine tool is installed. Once the air conditioner is activated, the room temperature in the factory changes to gradually settle to a certain temperature. In particular, when the room temperature changes, temperature differences are generated between the high places and the lower places in the factory. Further, differences in the temperature occur between areas near the outlet of the air conditioner, the doors and/or the windows of the factory and the areas distant therefrom. The magnitudes of the temperature differences and the temperature distributions change with the passage of time. Such changes in the temperature and the temperature distribution where a machine tool is installed result in temperature differences between each part of the machine tool, such as the front, back, upper and lower portions of a column or a workpiece mount. Thermal deformation, such as inclination or warping is generated by the uneven temperature of each part of he of machine tool. If a workpiece is machined under such a condition, the machining accuracy is decreased by the thermal deformation.

Japanese Examined Patent Publication No. 61-26453, as a first prior art for preventing thermal deformation of a column, discloses an electrical machining apparatus in which a pressurized liquid is filled within cavities of a column and a bed to enhance the thermal rigidity by increasing the thermal capacity of the column and the bed.

Japanese Unexamined Patent Publication No. 10-249660, as a second prior art, discloses a machine tool having a column with a cooling feature. The machine tool includes a cooling unit and coolant tank which are disposed within cavities, which have been made at the four corner portions of the column during the casting, for circulating the coolant.

In the electrical machining apparatus according to the first prior art, temperature differences are generated between each part of the column due to the changes in room temperature accompanied with the passage of time from the early morning through the noon to the night and the temperature distribution in the factory because the column and the bed are simply filled with a liquid. Therefore, the temperatures of the respective front, rear, top and bottom portions of the column cannot be the same, which results in a thermal deformation to reduce the machining accuracy.

In the machine tool according to the second prior art, the coolant, which is cooled by coolant supply and recovery means, is recirculated into the column. Therefore, a complex and large apparatus is required. Further, the coolant is constantly circulated even when a work is not machined. Therefore, there is a problem that the energy consumption is large.

SUMMARY OF THE INVENTION

The present invention is directed to solve the above-described problems of the prior art and the objective of the invention is to provide a machine tool with a feature, for preventing the thermal deformation, which can evenly maintain the temperature of each part of a column and a workpiece mount for mounting a workpiece of the machine tool even if there are changes in a temperature in a factory or temperature differences are generated in the factory.

Further, the objective of the present invention is to provide a machine tool, with a feature for preventing the thermal deformation, which allows control in which the time for supplying and circulating a liquid to an internal space define in the column and the workpiece mount is changed depending on the temperature distribution in the factory.

Further, the objective of the present invention is to provide a machine tool, with a feature for preventing the thermal deformation, which can evenly maintain the temperature of each part of the column and the workpiece mount of the machine tool and can reduce the energy consumption.

In the machine tool according to the present invention, a liquid is supplied and circulated to an internal space defined in the column and/or the workpiece mount for mounting a workpiece of the machine tool and the circulation period of the liquid is controlled by activating and deactivating liquid circulating means depending on the temperature distribution of the room temperature in a factory.

According to the present invention, there is provided a machine tool, with a feature for preventing a thermal deformation, which machine tool comprises a spindle head for supporting a spindle to which a tool is fitted, a column for supporting the spindle head and a table for mounting a workpiece and which machines a workpiece through a relative movement between the tool and the workpiece, characterized in that the machine tool comprises a column having an interior space which allows a liquid to be circulated, a liquid circulating means for supplying the liquid into the interior space for the circulation, and a liquid circulation controlling means for controlling the circulation of the liquid by activating and deactivating the liquid circulating means.

The liquid circulating means may comprise a liquid circulating pump.

The column may have an inlet port provided in a lower portion of the column and a outlet port provided in a upper portion of the column whereby the liquid is supplied into the interior space through the inlet port and drawn through the outlet port to flow the liquid upwardly within the interior space of the column.

A reinforcement rib may be provided in the interior space, the reinforcement rib including a plurality of through holes which allow passage of the liquid therethrough.

The liquid circulation controlling means activates and deactivates the liquid circulating means at a predetermined interval.

Upper and lower temperature sensors may be disposed in the upper and lower portions of the column. The liquid circulation controlling means activates and deactivates the liquid circulating means on the basis of the detection results of the upper and lower temperature sensors.

A workpiece mount may be secured to the table of the machine tool, for mounting the workpiece, the workpiece mount including an interior space which allows a liquid to be circulated.

The liquid circulating means may further supply the liquid into the interior space of the workpiece mount.

According to the present invention, a liquid is supplied and circulated into the internal space defined in the column or the workpiece mount for mounting a workpiece of the machine tool, which allows the temperature of each part of the column or the workpiece mount to be evenly maintained to prevent the thermal deformation of the column or the workpiece mount if there are changes in the room temperature or temperature distribution in a factory. Thus, the accuracy in machining a workpiece by the machine tool is improved.

Further, the liquid is continuously circulated during a transition period after the air conditioner is activated where the changes in the room temperature in the factory is large and the temperature differences between each part of the column and the workpiece mount for mounting a workpiece are large. When the temperature differences become small after the air conditioner is activated, the liquid is intermittently circulated. Thus, the present invention can effectively prevent the thermal deformation of the column and the workpiece mount by evenly maintaining the temperature of each part of column and the workpiece mount.

A described above, the present invention is not directed to make the temperature of each part of the column and the workpiece mount for mounting a workpiece of the machine tool follow the room temperature. The present invention is directed to evenly maintaining the temperature of each part of the column and the workpiece mount.

BRIEF DESCRIPTION OF THE DRAWINGS

FIG. 1 shows a partially cut-out side view with a block diagram of a machine tool with a feature for preventing a thermal deformation according to the present invention.

FIG. 2 is a diagram showing the relation between the changes in the room temperature in a factory and the operation of a circulating pump.

BEST MODE FOR CARRYING OUT THE INVENTION

First, a preferable embodiment of a machine tool according to the present invention will be described with reference to FIG. 1. In this embodiment, a horizontal machining center is described as an example. However, the present invention is not limited to this configuration and can be applied to, for example a vertical machining center, a milling machine, a grinder, a lathe, an electrical diesinking discharge machine and a wire electrical discharge machine.

A horizontal machining center 1 includes a bed 3 defining a base, a column 5 provided on the bed 3 in the reward portion thereof to move in Z-axial direction (left-and-right direction in FIG. 1), a spindle head 11, provided on the front face of the column 5 to move in Y-axial direction (top-and-bottom direction in FIG. 1), for rotationally supporting a spindle 9 to which a tool 7 is fitted, a table provided on the bed 4 in the forward portion thereof to move in X-axial direction (perpendicular to the page of FIG. 1) and a workpiece mount 17 for mounting a workpiece 15. The column 5 may be of a portal type, a double column type or a single column type.

Referring to FIG. 1, within the column 5, an interior space 5a extends over the top and bottom portions and front and back side portions of the column 5. In the embodiment shown in FIG. 1, the interior space 5a is formed by using a cavity formed in the column 5 to reduce its weight after consideration of its rigidity. The interior space 5a may be formed separately from the cavity for reducing the weight. Further, interior spaces may be formed at the four corners of the column 5 instead of the interior space 5a extending over the front to the back side portions of the column 5. A reinforcement rib 5b is provided within the interior space 5a. Provided in the rib 5a are plurality of through holes 5c through which a liquid is fed into entire of the interior space 5a. The interior space 5a of the column 5 includes a make-up inlet (not shown) at the top of the column 5. The liquid is initially fed through the make-up inlet to fill the interior space. The liquid is preferably water or an oil treated for the prevention of corrosion.

A circulating pump 19 is disposed behind the column 5, as liquid circulating means for supplying and circulating the liquid via external conduit 21. The circulating pump 19 is connected to an inlet port 21a, fluidly communicating with the lower portion of the interior space 5a, and an outlet port 21b, fluidly communicating with the upper portion of the interior space 5a, through conduits so that the liquid flows from the lower portion to the upper portion within the interior space 5a. The circulating pump 19 is preferably of a low heat generating type.

Likewise, as in the column 5, an internal space 17a may be defined within the workpiece mount 17 and a circulating pump and relative conduits may be provided as liquid circulating means for supplying and circulating a liquid through the interior space 17a of the workpiece mount 17. Further, the circulating pump 19 can be commonly used as the circulating pump for the workpiece mount 17.

Provided outside of the horizontal machining center 1 are NC device 25 which reads, interprets and executes an NC program to drive each of X-, Y- and X-axial feed motors (only Z-axial feed motor 23 is shown in FIG. 1), a circulating pump controller 27 for controlling the activation and deactivation of the circulating pump 19 and a timer 29 which generates a timing information to the circulating pump 27. The circulating pump 27 and the timer 29 are preferably provided in a machine controller for the horizontal machining center 1.

Next, with reference to FIG. 2, a method for controlling the circulating pump 19 by the circulating pump controller 27 is described. In the following explanation, the controlling method for the circulating pump 19 from a time an air conditioner is activated early in the morning, when the room temperature within a factory is low, will be described.

Once the air conditioner is activated, the room temperature increases to gradually approach a certain temperature. A portion indicated by "A" is a transition period where the rate of change in the room temperature is high, and a portion indicated by "B" is an equilibrium period where the rate of changes in the room temperature is relatively low. The transition period continues, for example, for one or two hours and temperature differences are generated between high and low places in a factory. This results in a temperature difference between upper portion and the lower portion of the column 5. Further, once an air conditioner is activated, temperature regulated air flows out of the ceiling of the factory to the upper portion of the column 5, which also results in temperature difference. According to the embodiment, the circulating pump 19 is continuously activated to circulate the liquid within the interior space 5a of the column 5 so that the temperature of each part of the column 5 is substantially the same. In this connection, the time and the frequency of activation and deactivation of the circulating pump 19 can be previously experimentally determined. On this basis the circulating pump 19 can be controlled by the circulating pump controller 27.

In the equilibrium period B, the room temperature in the factory is stabilized so that the temperature distribution is reduced. Therefore, the temperature difference between the upper and lower portions of the column 5 substantially disappears and the circulating pump 19 can intermittently activated for, for example, ten minutes every twenty minutes. Further, power supply switches for main parts of a machine are opened when the work 15 is mounted to or detached from the workpiece mount 17 or when the machine is deactivated, for example, during a lunchtime. In such a case, the circulating pump 19 may be intermittently activated, for example for ten minutes every one hour to supply the liquid to the interior space 5a so that the temperature of each part of the column 5 is substantially the same. This allows the temperature difference between the upper and lower portions of the column 5 to be removed so that a workpiece can immediately be machined with a high accuracy.

Next, another embodiment of the controlling method for the circulating pump 19 by the circulating pump controller 27 is described. As shown in FIG. 1, temperature sensors 31 and 33 are attached to the upper and lower portions of the column 5. The liquid within the interior space 5a of the column 5 can be circulated on the basis of the difference of the values detected by the upper temperature sensor 31 and the lower temperature sensor so that, for example when the temperature difference is larger than 2° C., the circulating pump 19 is continuously activated, when it is 1–2° C., the circulating pump is activated for ten minutes every twenty minutes and when it is lower than 1° C., an operation with a timer is preferentially selected.

The temperature of the liquid supplied into the interior space 5a may be automatically controlled by, for example, a liquid temperature controller provided outside of the machine. Further, the liquid which has been supplied into the interior space 5a may be recovered into a reservoir provided outside of the machine, the liquid in the reservoir being cooled through a liquid temperature controller and supplied and recirculated to the interior space 5a.

What is claimed is:

1. A machine tool with a feature preventing a thermal deformation, comprising a spindle head for supporting a spindle to which a tool is fitted, a column for supporting the spindle head and a table for mounting a workpiece, and machining a workpiece through a relative movement between the tool and the workpiece, characterized in that the machine tool comprises a column having an interior space which is filled with a liquid;

an inlet port, disposed at a lower portion of the column, for introducing the liquid into the interior space;

an outlet port, disposed at an upper portion of the column for removing the liquid from the interior spaces;

a liquid circulating means including an exterior conduit, free of a means to separately cool the liquid, extending between the outlet and inlet ports, and comprising means for circulating the liquid in the interior space through the outlet port, the exterior conduit and the inlet port to flow the liquid upwardly in the interior space; and a liquid circulation controlling means for controlling the circulation of the liquid by activating and deactivating the liquid circulating means.

2. A machine tool with a feature for preventing a thermal deformation according to claim 1, wherein the liquid circulating means comprises a liquid circulating pump.

3. A machine tool with a feature for preventing a thermal deformation according to claim 1, comprising a reinforcement rib in the interior space, the reinforcement rib including a plurality of through-holes which allow flow of the liquid therethrough.

4. A machine tool with a feature for preventing a thermal deformation according to claim 1, wherein the liquid circulation controlling means comprises means for activating and deactivating the liquid circulating means at a predetermined interval.

5. A machine tool with a feature for preventing a thermal deformation according to claim 1, further comprising upper and lower temperature sensors which are disposed at upper and lower portions of the column; and the liquid circulation controlling means comprising means for activating and deactivating the liquid circulating means on the basis of the temperature difference between the detection results of the upper and lower temperature sensors.

6. A machine tool with a feature for preventing a thermal deformation according to claim 1, further comprising a workpiece mount, secured to the table of the machine tool, and comprising means for mounting the workpiece; and the workpiece mount including an interior space which is filled with a liquid.

7. A machine tool with a feature for preventing a thermal deformation according to claim 6, wherein the liquid circulating means comprises means for further supplying the liquid which is removed from the interior space of the column, into the interior space of the workpiece mount.

8. A machine tool with a feature for evenly maintaining temperature of, and preventing variations in temperature of, different portions of a machine tool column and thereby preventing a thermal deformation, comprising a spindle head for supporting a spindle to which a tool is fitted, a column for supporting the spindle head and a table for mounting a workpiece, and machining a workpiece through a relative movement between the tool and the workpiece, characterized in that the machine tool comprises a column having an interior space which is filled with a liquid;

an inlet port, disposed at a lower portion of the column, for introducing the liquid into the interior space;

an outlet port, disposed at an upper portion of the column for removing the liquid from the interior space;

an exterior conduit between the outlet port and inlet port, extending directly between the outlet port and inlet port, to return liquid from the outlet port to the inlet port, with the exterior conduit being free of a means for separately cooling the liquid;

a liquid circulating means between the outlet and inlet ports, and comprising means for circulating the liquid in the interior space through the outlet port, the exterior conduit and the inlet port to flow the liquid upwardly in the interior space; and a liquid circulation controlling means for controlling the circulation of the liquid by activating and deactivating the liquid circulating means;

said exterior conduit, said liquid circulating means and said liquid circulation controlling means together comprising means whereby the temperature is evenly maintained throughout the column without separately needing to cool the liquid.

9. A machine tool with a means for preventing a thermal deformation according to claim 8, wherein the liquid circulating means comprises a liquid circulating pump.

10. A machine with a means for preventing a thermal deformation according to claim 8, comprising a reinforcement rib in the interior space, the reinforcement rib including, a plurality of through-holes which allow flow of the liquid therethrough.

11. A machine tool with a means for preventing a thermal deformation according to claim 8, wherein the liquid circulation controlling means activates and deactivates the liquid circulating means at a predetermined interval.

12. A machine tool with a means for preventing a thermal deformation according to claim 8, further comprising upper and lower temperature sensors which are disposed at upper and lower portions of the column; and the liquid circulation controlling means comprising means for activating and deactivating the liquid circulating means on the basis of the temperature difference between the detection results of the upper and lower temperature sensors.

13. A machine tool with a means for preventing a thermal deformation according to claim 8, further comprising a workpiece mount, secured to the table of the machine tool, for mounting the workpiece; and the workpiece mount including an interior space which is filled with a liquid.

14. A machine tool with a means for preventing a thermal deformation according to claim 13, wherein the liquid circulating means further comprises means for supplying the liquid which is removed from the interior space of the column, into the interior space of the workpiece mount.

* * * * *